(12) United States Patent
Tsai

(10) Patent No.: US 8,164,678 B2
(45) Date of Patent: Apr. 24, 2012

(54) OPTICAL PHOTOGRAPHING LENS ASSEMBLY

(75) Inventor: Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 62 days.

(21) Appl. No.: 12/939,522

(22) Filed: Nov. 4, 2010

(65) Prior Publication Data
US 2012/0033124 A1  Feb. 9, 2012

(30) Foreign Application Priority Data

Aug. 5, 2010 (TW) ................. 99126061 A

(51) Int. Cl.
*H04N 5/225* (2006.01)
*G02B 9/34* (2006.01)
*G02B 3/02* (2006.01)
(52) U.S. Cl. .................. 348/340; 359/773; 359/715
(58) Field of Classification Search .................. 348/335, 348/340; 359/715, 771, 772, 773
See application file for complete search history.

(56) References Cited

U.S. PATENT DOCUMENTS

| 7,145,736 B2 | 12/2006 | Noda | |
|---|---|---|---|
| 7,365,920 B2 | 4/2008 | Noda | |
| 7,969,664 B2 * | 6/2011 | Tang et al. | 359/773 |
| 2011/0115962 A1 * | 5/2011 | Chen et al. | 348/335 |
| 2011/0261470 A1 * | 10/2011 | Chen et al. | 359/715 |

* cited by examiner

*Primary Examiner* — David N Spector
(74) *Attorney, Agent, or Firm* — Morris Manning & Martin LLP; Tim Tingkang Xia, Esq.

(57) ABSTRACT

This invention provides an optical photographing lens assembly comprising, in order from an object side to an image side: a first lens element with positive refractive power having a convex object-side surface, at least one of the object-side and image-side surfaces thereof being aspheric; a second lens element with negative refractive power having a concave image-side surface; a third lens element with positive refractive power having a concave object-side surface and a convex image-side surface; and a fourth lens element with negative refractive power having a concave image-side surface on which at least one inflection point is formed, the object-side and image-side surfaces thereof being aspheric; wherein a stop is disposed between an imaged object and the first lens element and an electronic sensor is disposed at an image plane for forming images of the imaged object; and wherein the optical photographing lens assembly further comprises another stop disposed between the second and fourth lens elements.

10 Claims, 14 Drawing Sheets

| TABLE 1 | | | | | | |
|---|---|---|---|---|---|---|
| (Embodiment 1) | | | | | | |
| $f = 3.54$ mm, Fno = 3.50, HFOV= 32.6 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.035 | | | | |
| 2 | Lens 1 | 2.022650 (ASP) | 0.641 | Plastic | 1.512 | 57.0 | 2.60 |
| 3 | | -3.486300 (ASP) | 0.069 | | | | |
| 4 | Lens 2 | 4.756700 (ASP) | 0.447 | Plastic | 1.611 | 27.0 | -3.59 |
| 5 | | 1.446460 (ASP) | 0.280 | | | | |
| 6 | Stop 1 | Plano | 0.306 | | | | |
| 7 | Lens 3 | -3.749300 (ASP) | 0.842 | Plastic | 1.533 | 55.5 | 1.59 |
| 8 | | -0.744500 (ASP) | -0.280 | | | | |
| 9 | Stop 2 | Plano | 0.352 | | | | |
| 10 | Lens 4 | 20.786700 (ASP) | 0.430 | Plastic | 1.533 | 55.5 | -1.71 |
| 11 | | 0.867220 (ASP) | 0.600 | | | | |
| 12 | IR-filter | Plano | 0.300 | Glass | 1.516 | 64.1 | - |
| 13 | | Plano | 0.551 | | | | |
| 14 | Image | Plano | - | | | | |
| One half of aperture diameter of Stop 1 at the sixth surface is 0.85mm | | | | | | | |
| One half of aperture diameter of Stop 2 at the ninth surface is 1.38mm | | | | | | | |
| Reference wavelength is d-line(587.6 nm) | | | | | | | |

Fig.4

| TABLE 2 | | | | |
|---|---|---|---|---|
| Aspheric Coefficients | | | | |
| Surface # | 2 | 3 | 4 | 5 |
| k = | -2.61477E+00 | -3.11534E+00 | -5.07200E+00 | -7.64345E-02 |
| A3 = | -8.15605E-03 | -3.47923E-02 | -2.93524E-02 | 8.38379E-03 |
| A4 = | 5.61571E-02 | -2.78110E-02 | -1.21186E-01 | -2.06108E-01 |
| A5 = | -1.16253E-01 | -2.79850E-02 | -3.84044E-02 | 2.55144E-01 |
| A6 = | 5.75516E-02 | -1.22236E-01 | 1.59336E-01 | -2.88716E-01 |
| A7 = | 1.37884E-01 | -1.64778E-01 | -4.82238E-01 | -9.17907E-02 |
| A8 = | -4.98774E-01 | 3.26059E-01 | -6.56142E-02 | 2.56292E-01 |
| A9 = | 4.86175E-01 | 7.32553E-01 | 1.86872E+00 | 2.01903E-01 |
| A10= | -2.20627E-01 | -7.64147E-01 | -1.33060E+00 | -2.16144E-01 |
| Surface # | 7 | 8 | 10 | 11 |
| k = | 2.42542E+00 | -3.53336E+00 | -9.52712E-01 | -5.32208E+00 |
| A3 = | -1.18793E-02 | -3.60425E-03 | 3.82535E-02 | -2.40321E-02 |
| A4 = | -2.19443E-02 | -1.13685E-01 | -1.02730E-01 | -2.70063E-01 |
| A5 = | 1.56015E-01 | 8.36415E-02 | -4.21468E-02 | 2.71756E-01 |
| A6 = | 6.81809E-02 | -1.17299E-02 | 2.54394E-02 | -8.15005E-02 |
| A7 = | -1.31291E-01 | 1.67930E-02 | 3.94663E-02 | -4.06561E-02 |
| A8 = | -5.89475E-02 | 3.28127E-02 | -1.77031E-02 | 1.46757E-02 |
| A9 = | 1.26526E-01 | 2.64235E-02 | -6.30499E-03 | 1.20422E-02 |
| A10= | -4.98378E-02 | -3.12314E-02 | 3.54101E-03 | -5.00734E-03 |

Fig.5

| TABLE 3 | | | | | | | |
|---|---|---|---|---|---|---|---|
| (Embodiment 2) | | | | | | | |
| f= 3.70 mm, Fno = 2.75, HFOV= 31.9 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.112 | | | | |
| 2 | Lens 1 | 1.634330 (ASP) | 0.797 | Plastic | 1.512 | 56.5 | 2.67 |
| 3 | | -7.002000 (ASP) | 0.063 | | | | |
| 4 | Lens 2 | -88.200700 (ASP) | 0.442 | Plastic | 1.611 | 27.1 | -4.73 |
| 5 | | 2.992910 (ASP) | 0.250 | | | | |
| 6 | Stop 1 | Plano | 0.335 | | | | |
| 7 | Lens 3 | -4.929700 (ASP) | 0.778 | Plastic | 1.533 | 55.5 | 2.43 |
| 8 | | -1.082660 (ASP) | 0.280 | | | | |
| 9 | Lens 4 | -1065.739000 (ASP) | 0.451 | Plastic | 1.512 | 56.5 | -1.94 |
| 10 | | 0.995350 (ASP) | 0.400 | | | | |
| 11 | IR-filter | Plano | 0.300 | Glass | 1.516 | 64.1 | - |
| 12 | | Plano | 0.362 | | | | |
| 13 | Image | Plano | - | | | | |
| One half of aperture diameter of Stop 1 at the sixth surface is 0.90mm Reference wavelength is d-line(587.6 nm) | | | | | | | |

Fig.6

| TABLE 4 | | | | |
|---|---|---|---|---|
| Aspheric Coefficients | | | | |
| Surface # | 2 | 3 | 4 | 5 |
| k = | -6.67708E+00 | -4.97691E+01 | -1.00000E+00 | -9.16172E+00 |
| A3 = | 1.28413E-02 | -1.18784E-02 | -1.63527E-02 | -1.12309E-02 |
| A4 = | 1.28465E-01 | -4.64907E-03 | -5.69233E-02 | 5.38470E-02 |
| A5 = | 2.90004E-02 | -1.73043E-01 | 1.26900E-01 | 4.79497E-02 |
| A6 = | 3.25822E-02 | 2.63424E-01 | -3.97780E-01 | -5.03473E-02 |
| A7 = | -1.06491E-01 | -4.10330E-01 | 1.76448E-01 | -1.70824E-01 |
| A8 = | -1.17298E+00 | 4.78476E-01 | 8.49863E-01 | 1.80392E-01 |
| A9 = | 2.57643E+00 | 1.03233E+00 | -6.92834E-02 | 3.03035E-01 |
| A10= | -1.44231E+00 | -1.15617E+00 | -5.51325E-01 | -2.37497E-01 |
| A11= |  |  |  | -9.48375E-03 |
| A12= |  |  |  | -1.56028E-02 |
| A13= |  |  |  | -2.83910E-02 |
| A14= |  |  |  | -7.55535E-03 |
| A15= |  |  |  | 1.60530E-02 |
| A16= |  |  |  | 5.54848E-02 |
| Surface # | 7 | 8 | 9 | 10 |
| k = | -9.80641E+00 | -4.53482E+00 | -1.00000E+00 | -5.34297E+00 |
| A3 = | 1.09350E-02 | 2.72918E-03 | 4.14676E-02 | 9.73563E-02 |
| A4 = | 4.55964E-02 | -2.22084E-01 | -4.07917E-01 | -5.56490E-01 |
| A5 = | -2.12694E-01 | 1.30173E-01 | -3.31047E-01 | 4.79975E-01 |
| A6 = | 1.94623E-01 | -4.56419E-02 | 9.55694E-01 | -9.61519E-02 |
| A7 = | -1.50475E-01 | 5.02900E-03 | -5.60313E-01 | -6.46034E-02 |
| A8 = | -4.78488E-02 | 2.31990E-02 | 1.05491E-01 | 2.37261E-02 |
| A9 = | 2.83633E-01 | 2.83776E-02 | -3.53495E-06 | 5.34343E-03 |
| A10= | -1.64172E-01 | -1.75075E-02 |  | -2.43832E-03 |
| A11= | 3.38786E-03 |  |  |  |
| A12= | 2.50565E-03 |  |  |  |
| A13= | -9.20491E-03 |  |  |  |
| A14= | -9.44909E-03 |  |  |  |
| A15= | -2.54439E-03 |  |  |  |
| A16= | 1.90384E-02 |  |  |  |

Fig.7

| TABLE 5 | | | | | | | |
|---|---|---|---|---|---|---|---|
| (Embodiment 3) | | | | | | | |
| f = 3.43 mm, Fno = 3.00, HFOV= 33.5 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.052 | | | | |
| 2 | Lens 1 | 1.996690 (ASP) | 0.697 | Plastic | 1.512 | 57.0 | 2.24 |
| 3 | | -2.382740 (ASP) | 0.050 | | | | |
| 4 | Lens 2 | 16.928000 (ASP) | 0.452 | Plastic | 1.611 | 27.0 | -2.97 |
| 5 | | 1.622040 (ASP) | 0.543 | | | | |
| 6 | Lens 3 | -3.213800 (ASP) | 0.810 | Plastic | 1.533 | 55.5 | 1.61 |
| 7 | | -0.735240 (ASP) | -0.350 | | | | |
| 8 | Stop 2 | Plano | 0.405 | | | | |
| 9 | Lens 4 | 72.092300 (ASP) | 0.497 | Plastic | 1.533 | 55.5 | -1.67 |
| 10 | | 0.876340 (ASP) | 0.700 | | | | |
| 11 | IR-filter | Plano | 0.300 | Glass | 1.518 | 64.1 | - |
| 12 | | Plano | 0.349 | | | | |
| 13 | Image | Plano | - | | | | |
| One half of aperture diameter of Stop 2 at the eighth surface is 1.31mm | | | | | | | |
| Reference wavelength is d-line(587.6 nm) | | | | | | | |

Fig.8

| TABLE 6 | | | | |
|---|---|---|---|---|
| Aspheric Coefficients | | | | |
| Surface # | 2 | 3 | 4 | 5 |
| k  = | -2.56646E+00 | -2.85454E+00 | -1.00000E+00 | -3.37626E-02 |
| A3 = | -9.77179E-03 | -3.52137E-02 | -2.62850E-02 | 6.48577E-03 |
| A4 = | 5.18725E-02 | -2.80112E-02 | -1.19636E-01 | -2.03431E-01 |
| A5 = | -1.17758E-01 | -2.89129E-02 | -4.06701E-02 | 2.55699E-01 |
| A6 = | 4.78374E-02 | -1.27210E-01 | 1.52480E-01 | -2.82237E-01 |
| A7 = | 1.29489E-01 | -1.79695E-01 | -4.76614E-01 | -8.86816E-02 |
| A8 = | -4.88410E-01 | 2.84989E-01 | -6.70641E-02 | 2.48692E-01 |
| A9 = | 4.65018E-01 | 6.79162E-01 | 1.82275E+00 | 1.91417E-01 |
| A10= | -2.69548E-01 | -7.70594E-01 | -1.34355E+00 | -2.19061E-01 |
| Surface # | 6 | 7 | 9 | 10 |
| k  = | 2.64069E+00 | -3.37018E+00 | -9.59239E-01 | -5.32299E+00 |
| A3 = | -9.21754E-03 | -7.23634E-03 | 3.87943E-02 | -2.48066E-02 |
| A4 = | -2.21885E-02 | -1.14065E-01 | -1.01467E-01 | -2.66908E-01 |
| A5 = | 1.52053E-01 | 8.34595E-02 | -4.13500E-02 | 2.70595E-01 |
| A6 = | 6.43846E-02 | -1.06598E-02 | 2.55644E-02 | -8.10035E-02 |
| A7 = | -1.32461E-01 | 1.74832E-02 | 3.92341E-02 | -4.07167E-02 |
| A8 = | -6.03500E-02 | 3.30815E-02 | -1.73170E-02 | 1.42977E-02 |
| A9 = | 1.22435E-01 | 2.65935E-02 | -6.15396E-03 | 1.18353E-02 |
| A10= | -5.08749E-02 | -3.01917E-02 | 3.49708E-03 | -4.81806E-03 |

Fig.9

| TABLE 7 | | Embodiment 1 | Embodiment 2 | Embodiment 3 |
|---|---|---|---|---|
| f | | 3.54 | 3.70 | 3.43 |
| Fno | | 3.50 | 2.75 | 3.00 |
| HFOV | | 32.6 | 31.9 | 33.5 |
| V1-V2 | | 30.0 | 29.4 | 30.0 |
| R1/R2 | | -0.58 | -0.23 | -0.84 |
| R4/R3 | | 0.30 | -0.03 | 0.10 |
| Td/f | | 0.87 | 0.92 | 0.90 |
| f/f3 | | 2.23 | 1.52 | 2.13 |
| f/f4 | | -2.07 | -1.91 | -2.05 |
| f1/f3 | | 1.64 | 1.10 | 1.39 |
| (ImgH-0.7*LS)/ImgH | Stop 1 | 0.09 | 0.15 | - |
| | Stop 2 | 0.36 | - | 0.36 |
| YS/ImgH | Stop 1 | 0.37 | 0.39 | - |
| | Stop 2 | 0.59 | - | 0.56 |
| DS/DL | Stop 1 | 0.39 | 0.38 | - |
| | Stop 2 | 0.42 | - | 0.34 |
| TTL/ImgH | | 1.91 | 1.89 | 1.85 |

Fig.10

OPTICAL PHOTOGRAPHING LENS ASSEMBLY

CROSS-REFERENCE TO RELATED APPLICATIONS

This non-provisional application claims priority under 35 U.S.C. §119(a) on Patent Application No(s). 099126061 filed in Taiwan, R.O.C. on Aug. 5, 2010, the entire contents of which are hereby incorporated by reference.

BACKGROUND OF THE INVENTION

1. Field of the Invention

The present invention relates to an optical photographing lens assembly, and more particularly, to a compact optical photographing lens assembly used in a portable electronic product.

2. Description of the Prior Art

The demand for compact imaging lenses has grown in recent years as the popularity of portable electronic products with the photographing function has increased, and the sensor of a general photographing camera is none other than CCD (charge coupled device) or CMOS (Complementary Metal Oxide Semiconductor Sensor). Furthermore, as advanced semiconductor manufacturing technology has allowed the pixel size of sensors to be reduced, and the resolution of compact imaging lenses has gradually increased, there is an increasing demand for compact imaging lenses featuring better image quality.

Generally, a conventional optical system for compact imaging lenses, such as the one disclosed in U.S. Pat. No. 7,145,736, is of a triplet type comprising, in order from the object side to the image side: a first lens element with positive refractive power; a second lens element with negative refractive power; and a third lens element with positive refractive power. As the popularity of high profile mobile devices such as smart phones and PDAs has led to a rapid increase in the resolution and image quality of compact imaging lenses, a conventional three-element lens has become insufficient for high-end imaging lens modules.

U.S. Pat. No. 7,365,920 has disclosed a four lens element assembly, wherein two spherical-surface glass lenses serving as the first and second lens elements are adhered together to form a doublet and thereby to correct the chromatic aberration. Such an arrangement of optical elements, however, has the following disadvantages: (1) the freedom of the system is curtailed due to the employment of excess number of spherical-surface glass lenses, thus the total track length of the system cannot be reduced easily; (2) the process of adhering glass lenses together is complicated, posing difficulties in manufacture. As there is an ongoing trend toward compact yet powerful electronic products, more compact imaging lenses with higher specification will be developed, that is, the lens elements must be arranged closer together in a relatively small space. However, such an arrangement may cause multiple reflections and refractions of the unwanted light within the lens assembly, compromising the image quality of the lens assembly.

Therefore, a need exists in the art for an optical photographing lens assembly that features better image quality, maintains a moderate total track length and is applicable to compact portable electronic products.

SUMMARY OF THE INVENTION

The present invention provides an optical photographing lens assembly comprising, in order from an object side to an image side: a first lens element with positive refractive power having a convex object-side surface, at least one of the object-side and image-side surfaces thereof being aspheric; a second lens element with negative refractive power having a concave image-side surface; a third lens element with positive refractive power having a concave object-side surface and a convex image-side surface; and a fourth lens element with negative refractive power having a concave image-side surface on which at least one inflection point is formed, the object-side and image-side surfaces thereof being aspheric; wherein a stop is disposed between an imaged object and the first lens element and an electronic sensor is disposed at an image plane for forming images of the imaged object; wherein the optical photographing lens assembly further comprises another stop disposed between the second and fourth lens elements; and wherein half of the diagonal length of the effective pixel area of the electronic sensor is ImgH, the distance on the optical axis between the another stop disposed between the second and fourth lens elements and the electronic sensor is LS, half of the aperture diameter of the another stop is YS, the distance on the optical axis between the another stop and the object-side surface of the lens element adjacent to and on the object side of the another stop is DS, the distance on the optical axis between the object-side surface of the lens element adjacent to and on the object side of the another stop and the image-side surface of the lens element adjacent to and on the image side of the another stop is DL, the focal length of the optical photographing lens assembly is f, the focal length of the third lens element is f3, the focal length of the fourth lens element is f4, the distance on the optical axis between the object-side surface of the lens element with refractive power closest to the object side and the image-side surface of the lens element with refractive power closest to the image side is Td, the Abbe number of the first lens element is V1, the Abbe number of the second lens element is V2, and they satisfy the relations: $(ImgH-0.7*LS)/ImgH < YS/ImgH < 0.74$, $0.10 < DS/DL < 0.73$, $1.35 < f/f3 < 2.50$, $-2.60 < f/f4 < -1.75$, $0.85 < Td/f < 0.92$, $20.0 < V1-V2 < 42.0$.

The present invention provides another optical photographing lens assembly comprising, in order from the object side to the image side: a first lens element with positive refractive power having a convex object-side surface; a second lens element with negative refractive power having a concave image-side surface; a third lens element with positive refractive power having a concave object-side surface and a convex image-side surface, the object-side and image-side surfaces thereof being aspheric; and a fourth lens element with negative refractive power having a concave image-side surface on which at least one inflection point is formed, the object-side and image-side surfaces thereof being aspheric; wherein a stop is disposed between an imaged object and the first lens element and an electronic sensor is disposed at an image plane for forming images of the imaged object; wherein the optical photographing lens assembly further comprises another stop disposed between the second and third lens elements; and wherein half of the diagonal length of the effective pixel area of the electronic sensor is ImgH, the distance on the optical axis between the another stop disposed between the second and third lens elements and the electronic sensor is LS, half of the aperture diameter of the another stop is YS, the distance on the optical axis between the another stop and the object-side surface of the lens element adjacent to and on the object side of the another stop is DS, the distance on the optical axis between the object-side surface of the lens element adjacent to and on the object side of the another stop and the image-side surface of the lens element adjacent to and on the image side of the another stop is DL, the focal length of the optical photographing lens assembly is f, the focal length of the third lens element is f3, the focal length of the fourth lens element is f4, the Abbe number of the first lens element is V1, the Abbe number of the second lens element is V2, and they satisfy the relations: (ImgH−0.7*LS)/ImgH<YS/ImgH<0.74, 0.10<DS/DL<0.73, 1.35<f/f3<2.50, −2.60<f/f4<−1.75, 28.5<V1−V2<42.0.

With the aforementioned arrangement of optical lenses, the total track length of the optical photographing lens assembly can be controlled effectively, the sensitivity of the optical system can be attenuated, and the amount of unnecessary light which, after multiple refractions and reflections within the lens assembly, enters the imaging region can be reduced to improve the image quality of the optical system.

In the present optical photographing lens assembly, the first lens element with positive refractive power provides part of the refractive power for the optical system so as to favorably reduce the total track length of the optical photographing lens assembly; the second lens element has negative refractive power so that the aberration generated by the first lens element with positive refractive power and the chromatic aberration of the optical system can be favorably corrected; the third lens element has positive refractive power so that the refractive power required by the optical system can be mutually distributed by the first and third lens elements, thereby to prevent the refractive power of any single lens element from becoming too large and to favorably attenuate the sensitivity of the optical system; the fourth lens element has negative refractive power so that the principal point of the optical system can be positioned away from the image plane, thereby the total track length of the optical system can be favorably reduced to keep the lens assembly compact.

In the present optical photographing lens assembly, the first lens element has a convex object-side surface so that the refractive power thereof can be effectively enhanced, thereby favorably reducing the total track length of the optical photographing lens assembly. The second lens element has a concave image-side surface so that the back focal length of the optical system can be extended effectively, thereby providing sufficient space to accommodate other components. The third lens element has a concave object-side surface and a convex image-side surface so that the astigmatism of the optical system can be corrected favorably. The fourth lens element has a concave image-side surface so that the principal point of the optical system can be positioned even farther away from the image plane to keep the lens assembly compact. Moreover, the image-side surface of the fourth lens element is provided with at least one inflection point, thereby the angle at which the light is projected onto the sensor from the off-axis field can be effectively reduced to further correct the off-axis aberrations.

In the present optical photographing lens assembly, a stop is disposed between an imaged object and the first lens element. The present optical photographing lens assembly further comprises at least another stop disposed between the second and third lens elements, or between the third and fourth lens elements. A stop is a light shielding element disposed in a lens assembly. The light shielding element, having an aperture which is configured to control the amount of incident light, functions as an aperture stop for controlling the amount of light entering the lens assembly or as a stop for correcting borderline light or eliminating unnecessary light.

In the present optical photographing lens assembly, when the stop disposed between the imaged object and the first lens element is an aperture stop, the exit pupil of the optical photographing lens assembly can be positioned away from the image plane, thus light will be projected onto the electronic sensor at a nearly perpendicular angle, and this is the telecentric feature of the image side. The telecentric feature is very important to the photosensitive power of the solid-state sensor as it can improve the photosensitivity of the sensor to reduce the probability of the occurrence of shading and facilitate the reduction of the total track length of the optical photographing lens assembly. The another stop disposed between the second and third lens elements, or between the third and fourth lens elements, is configured to control the range of light incident upon the optical system so that the amount of unnecessary light which, after multiple refractions and reflections within the lens assembly, enters the imaging region can be reduced to improve the image quality of the optical system.

BRIEF DESCRIPTION OF THE DRAWINGS

FIG. 4 is TABLE 1 which lists the optical data of the first embodiment.

FIG. 5 is TABLE 2 which lists the aspheric surface data of the first embodiment.

FIG. 6 is TABLE 3 which lists the optical data of the second embodiment.

FIG. 7 is TABLE 4 which lists the aspheric surface data of the second embodiment.

FIG. 8 is TABLE 5 which lists the optical data of the third embodiment.

FIG. 9 is TABLE 6 which lists the aspheric surface data of the third embodiment.

FIG. 10 is TABLE 7 which lists the data of the respective embodiments resulting from the equations.

DETAILED DESCRIPTION OF THE PREFERRED EMBODIMENTS

Figure 1A:
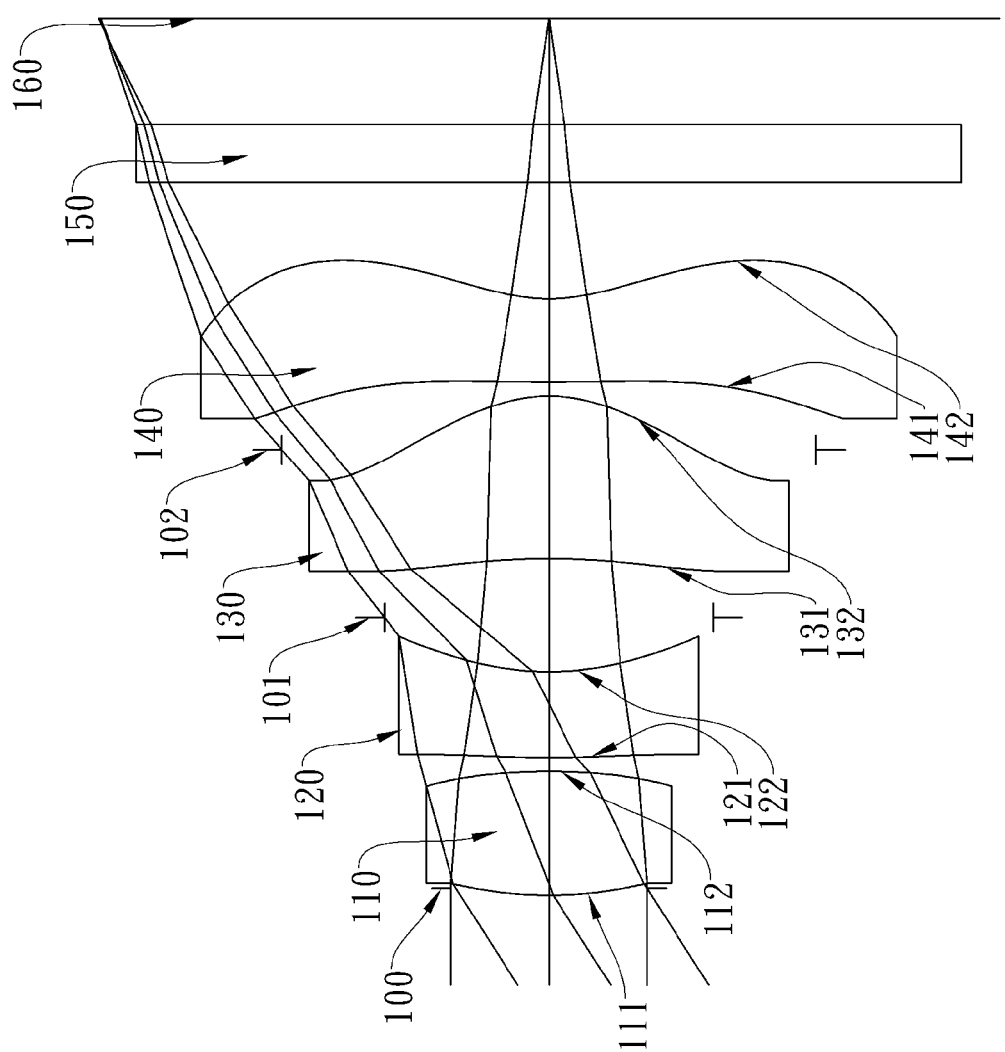
FIG. 1A shows an optical photographing lens assembly in accordance with a first embodiment of the present invention.

The present invention provides an optical photographing lens assembly comprising, in order from an object side to an image side: a first lens element with positive refractive power having a convex object-side surface, at least one of the object-side and image-side surfaces thereof being aspheric; a second lens element with negative refractive power having a concave image-side surface; a third lens element with positive refractive power having a concave object-side surface and a convex image-side surface; and a fourth lens element with negative refractive power having a concave image-side surface on which at least one inflection point is formed, the object-side and image-side surfaces thereof being aspheric; wherein a stop is disposed between an imaged object and the first lens element and an electronic sensor is disposed at an image plane for forming images of the imaged object; wherein the optical photographing lens assembly further comprises another stop disposed between the second and fourth lens elements; and wherein half of the diagonal length of the effective pixel area of the electronic sensor is ImgH, the distance on the optical axis between the another stop disposed between the second and fourth lens elements and the electronic sensor is LS, half of the aperture diameter of the another stop is YS, the distance on the optical axis between the another stop and the object-side surface of the lens element adjacent to and on the object side of the another stop is DS, the distance on the optical axis between the object-side surface of the lens element adjacent to and on the object side of the another stop and the image-side surface of the lens element adjacent to and on the image side of the another stop is DL, the focal length of the optical photographing lens assembly is f, the focal length of the third lens element is f3, the focal length of the fourth lens element is f4, the distance on the optical axis between the object-side surface of the lens element with refractive power closest to the object side and the image-side surface of the lens element with refractive power closest to the image side is Td, the Abbe number of the first lens element is V1, the Abbe number of the second lens element is V2, and they satisfy the relations: (ImgH−0.7*LS)/ImgH<YS/ImgH<0.74, 0.10<DS/DL<0.73, 1.35<f/f3<2.50, −2.60<f/f4<−1.75, 0.85<Td/f<0.92, 20.0<V1−V2<42.0.

When the relation of (ImgH−0.7*LS)/ImgH<YS/ImgH<0.74 is satisfied, the aperture size of the another stop can be effectively controlled to shield the lens assembly from the unnecessary light, thereby the amount of unnecessary light which, after multiple refractions and reflections within the lens assembly, enters the imaging region can be reduced to improve the image quality of the optical system. The satisfaction of the above relation also prevents the another stop from blocking off too much light so that the optical system can maintain a satisfactory illumination. When the relation of 0.10<DS/DL<0.73 is satisfied, the relative locations and distances between the another stop and its adjacent lens elements can be effectively controlled to facilitate the arrangement and assembly of the another stop and its adjacent lens elements. When the relation of 1.35<f/f3<2.50 is satisfied, the distribution of refractive power of the third lens element is more appropriate so that the refractive power required by the optical system can be mutually distributed by the first and third lens elements favorably, thereby to prevent the refractive power of any single lens element from becoming too large and to attenuate the sensitivity of the optical system effectively. When the relation of −2.60<f/f4<−1.75 is satisfied, the principal point of the optical system can be positioned even farther away from the image plane, thereby the total track length of the optical system can be favorably reduced to keep the lens assembly compact. When the relation of 0.85<Td/f<0.92 is satisfied, the lens elements can be placed closer together to keep the lens assembly compact, thereby the total track length of the optical photographing lens assembly can be favorably reduced. When the relation of 20.0<V1−V2<42.0 is satisfied, the chromatic aberration of the optical photographing lens assembly can be favorably corrected.

In the aforementioned optical photographing lens assembly, it is preferable that the stop disposed between the imaged object and the first lens element is an aperture stop so that the telecentric feature of the optical system can be favorably achieved. The telecentric feature can improve the photosensitivity of the electronic sensor to reduce the probability of the occurrence of shading and facilitate the shortening of the total track length of the optical photographing lens assembly.

In the aforementioned optical photographing lens assembly, the focal length of the first lens element is f1, the focal length of the third lens element is f3, and they preferably satisfy the relation: 1.10<f1/f3<1.85. When the above relation is satisfied, the distribution of refractive power between the first lens element and the third lens element is more balanced, thereby favorably attenuating the sensitivity of the optical system and suppressing the occurrence of aberrations.

In the aforementioned optical photographing lens assembly, the Abbe number of the first lens element is V1, the Abbe number of the second lens element is V2, and they preferably satisfy the relation: 28.5<V1−V2<42.0. The satisfaction of the above relation facilitates the correction of the chromatic aberration of the optical photographing lens assembly.

In the aforementioned optical photographing lens assembly, the radius of curvature of the image-side surface of the second lens element is R4, the radius of curvature of the object-side surface of the second lens element is R3, and they preferably satisfy the relation: −0.30<R4/R3<0.30. When the above relation is satisfied, the aberration generated by the first lens element can be favorably corrected. The satisfaction of the above relation also prevents the refractive power of the second lens element from becoming too large so that the high order aberration will not be too large.

In the aforementioned optical photographing lens assembly, the radius of curvature of the object-side surface of the first lens element is R1, the radius of curvature of the image-side surface of the first lens element is R2, and they preferably satisfy the relation: −1.0<R1/R2<0. The satisfaction of the above relation facilitates the correction of the spherical aberration of the optical system.

In the aforementioned optical photographing lens assembly, the distance on the optical axis between the object-side surface of the first lens element and the electronic sensor is TTL, half of the diagonal length of the effective pixel area of the electronic sensor is ImgH, and they preferably satisfy the relation: TTL/ImgH<2.0. The satisfaction of the above relation enables the optical photographing lens assembly to maintain a compact form so that it can be installed in compact electronic products.

The present invention provides another optical photographing lens assembly comprising, in order from the object side to the image side: a first lens element with positive refractive power having a convex object-side surface; a second lens element with negative refractive power having a concave image-side surface; a third lens element with positive refractive power having a concave object-side surface and a convex image-side surface, the object-side and image-side surfaces thereof being aspheric; and a fourth lens element with negative refractive power having a concave image-side surface on which at least one inflection point is formed, the object-side and image-side surfaces thereof being aspheric; wherein a stop is disposed between an imaged object and the first lens element and an electronic sensor is disposed at an image plane for forming images of the imaged object; wherein the optical photographing lens assembly further comprises another stop disposed between the second and third lens elements; and wherein half of the diagonal length of the effective pixel area of the electronic sensor is ImgH, the distance on the optical axis between the another stop disposed between the second and third lens elements and the electronic sensor is LS, half of the aperture diameter of the another stop is YS, the distance on the optical axis between the another stop and the object-side surface of the lens element adjacent to and on the object side of the another stop is DS, the distance on the optical axis between the object-side surface of the lens element adjacent to and on the object side of the another stop and the image-side surface of the lens element adjacent to and on the image side of the another stop is DL, the focal length of the optical photographing lens assembly is f, the focal length of the third lens element is f3, the focal length of the fourth lens element is f4, the Abbe number of the first lens element is V1, the Abbe number of the second lens element is V2, and they satisfy the relations: (ImgH−0.7*LS)/ImgH<YS/ImgH<0.74, 0.10<DS/DL<0.73, 1.35<f/f3<2.50, −2.60<f/f4<−1.75, 28.5<V1−V2<42.0.

When the relation of (ImgH−0.7*LS)/ImgH<YS/ImgH<0.74 is satisfied, the aperture size of the another stop can be effectively controlled to shield the lens assembly from the unnecessary light, thereby the amount of unnecessary light which, after multiple refractions and reflections within the lens assembly, enters the imaging region can be reduced to improve the image quality of the optical system. The satisfaction of the above relation also prevents the another stop from blocking off too much light so that the optical system can maintain a satisfactory illumination. When the relation of 0.10<DS/DL<0.73 is satisfied, the relative locations and distances between the another stop and its adjacent lens elements can be effectively controlled to facilitate the arrangement and assembly of the another stop and its adjacent lens elements. When the relation of 1.35<f/f3<2.50 is satisfied, the distribution of refractive power of the third lens element is more appropriate so that the refractive power required by the optical system can be mutually distributed by the first and third lens elements favorably, thereby to prevent the refractive power of any single lens element from becoming too large and to attenuate the sensitivity of the optical system effectively. When the relation of −2.60<f/f4<−1.75 is satisfied, the principal point of the optical system can be positioned even farther away from the image plane, thereby the total track length of the optical system can be favorably reduced to keep the lens assembly compact. When the relation of 28.5<V1−V2<42.0 is satisfied, the chromatic aberration of the optical photographing lens assembly can be favorably corrected.

In the aforementioned optical photographing lens assembly, it is preferable that the stop disposed between the imaged object and the first lens element is an aperture stop so that the telecentric feature of the optical system can be favorably achieved. The telecentric feature can improve the photosensitivity of the electronic sensor to reduce the probability of the occurrence of shading and facilitate the shortening of the total track length of the optical photographing lens assembly.

In the aforementioned optical photographing lens assembly, the focal length of the first lens element is f1, the focal length of the third lens element is f3, and they preferably satisfy the relation: 1.10<f1/f3<1.85. When the above relation is satisfied, the distribution of refractive power between the first lens element and the third lens element is more balanced, thereby favorably attenuating the sensitivity of the optical system and suppressing the occurrence of aberrations.

In the present optical photographing lens assembly, the lens elements can be made of glass or plastic material. If the lens elements are made of glass, there is more freedom in distributing the refractive power of the optical system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements. Consequently, the total track length of the optical photographing lens assembly can be effectively reduced.

In the present optical photographing lens assembly, if a lens element has a convex surface, it means the portion of the surface in proximity to the optical axis is convex; if a lens element has a concave surface, it means the portion of the surface in proximity to the optical axis is concave.

Figure 11:
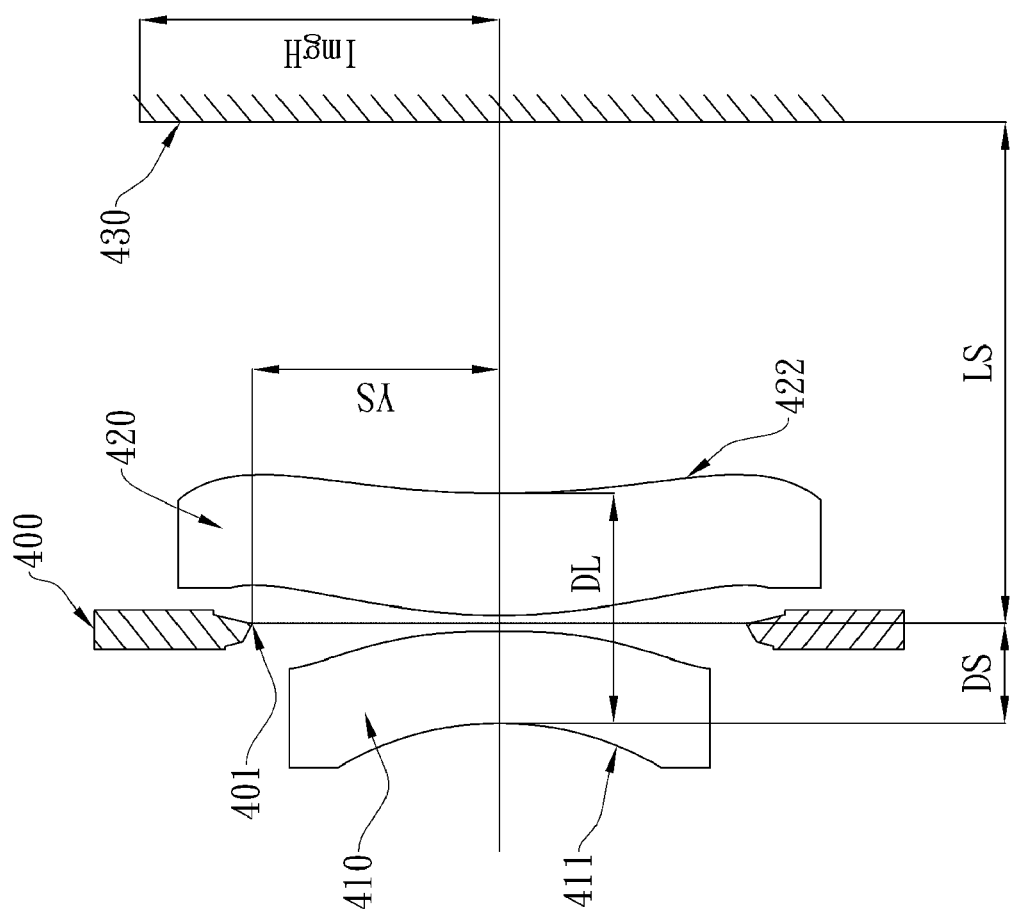
FIG. 11 shows the distances and relative locations represented by LS, YS, DS and DL.

In the present optical photographing lens assembly, a stop is a light shielding element disposed in a lens assembly. The light shielding element has an aperture (the aperture need not be circular or in any other particular shape) which is configured to control the amount of incident light. The stop can function as an aperture stop for controlling the amount of light entering the lens assembly or as a stop for correcting the borderline light or eliminating the unwanted light. The location of the stop is at the minimal aperture diameter. Regarding the stop disposed between the second and third lens elements, or between the third and fourth lens elements, FIG. 11 illustrates the distances and relative locations represented by LS, YS, DS and DL. LS is the distance on the optical axis between the stop 400 and the electronic sensor 430; YS is half of the aperture diameter of the stop 400, i.e. the distance from the point 401 to the optical axis; DS is the distance on the optical axis between the stop 400 and the object-side surface 411 of the lens element 410 adjacent to and on the object side of the stop 400; DL is the distance on the optical axis between the object-side surface 411 of the lens element 410 adjacent to and on the object side of the stop 400 and the image-side surface 422 of the lens element 420 adjacent to and on the image side of the stop 400.

Preferred embodiments of the present invention will be described in the following paragraphs by referring to the accompanying drawings.

Figure 1B:
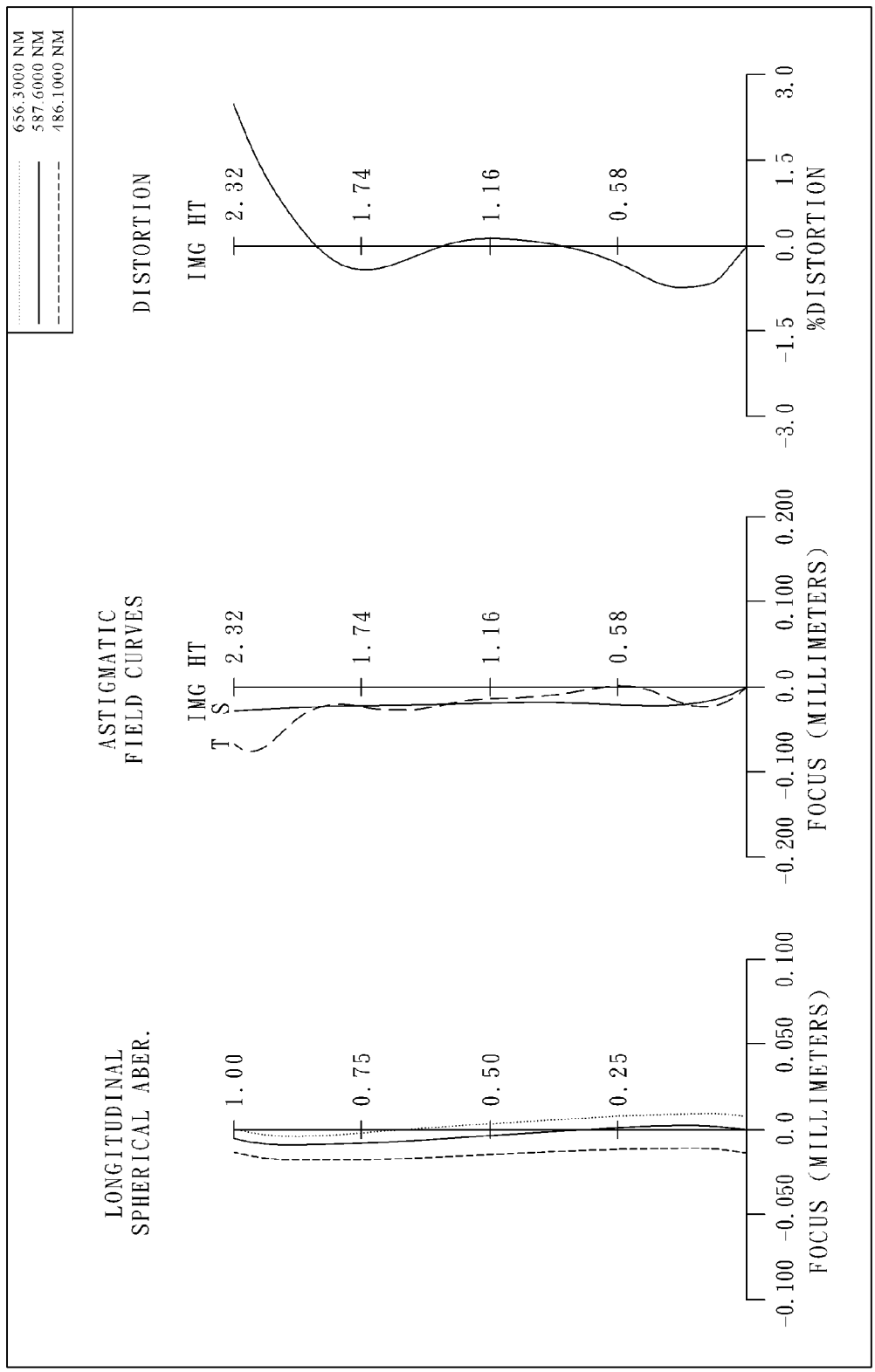
FIG. 1B shows the aberration curves of the first embodiment of the present invention.

FIG. 1A shows an optical photographing lens assembly in accordance with a first embodiment of the present invention, and FIG. 1B shows the aberration curves of the first embodiment of the present invention. The optical photographing lens assembly of the first embodiment of the present invention mainly comprises four lens elements, in order from an object side to an image side: a plastic first lens element 110 with positive refractive power having a convex object-side surface 111 and a convex image-side surface 112, the object-side and image-side surfaces 111 and 112 thereof being aspheric; a plastic second lens element 120 with negative refractive power having a convex object-side surface 121 and a concave image-side surface 122, the object-side and image-side surfaces 121 and 122 thereof being aspheric; a plastic third lens element 130 with positive refractive power having a concave object-side surface 131 and a convex image-side surface 132, the object-side and image-side surfaces 131 and 132 thereof being aspheric; and a plastic fourth lens element 140 with negative refractive power having a convex object-side surface 141 and a concave image-side surface 142 on which at least one inflection point is formed, the object-side and image-side surfaces 141 and 142 thereof being aspheric; wherein an aperture stop 100 is disposed between an imaged object and the first lens element 110; wherein a first stop 101 is disposed between the second lens element 120 and the third lens element 130 and half of the aperture diameter (YS) thereof is 0.85 mm; and wherein a second stop 102 is disposed between the third lens element 130 and the fourth lens element 140 and half of the aperture diameter (YS) thereof is 1.38 mm. The optical photographing lens assembly further comprises an IR filter 150 disposed between the image-side surface 142 of the fourth lens element 140 and an image plane 160; the IR filter 150 is made of glass and has no influence on the focal length of the optical photographing lens assembly. Moreover, an electronic sensor is disposed at the image plane 160 for forming images of the imaged object.

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical photographing lens assembly, the focal length of the optical photographing lens assembly is f, and it satisfies the relation: f=3.54 (mm).

In the first embodiment of the present optical photographing lens assembly, the f-number of the optical photographing lens assembly is Fno, and it satisfies the relation: Fno=3.50.

In the first embodiment of the present optical photographing lens assembly, half of the maximal field of view of the optical photographing lens assembly is HFOV, and it satisfies the relation: HFOV=32.6 deg.

In the first embodiment of the present optical photographing lens assembly, the Abbe number of the first lens element 110 is V1, the Abbe number of the second lens element 120 is V2, and they satisfy the relation: V1−V2=30.0.

In the first embodiment of the present optical photographing lens assembly, the radius of curvature of the object-side surface 111 of the first lens element 110 is R1, the radius of curvature of the image-side surface 112 of the first lens element 110 is R2, and they satisfy the relation: R1/R2=−0.58.

In the first embodiment of the present optical photographing lens assembly, the radius of curvature of the image-side surface 122 of the second lens element 120 is R4, the radius of curvature of the object-side surface 121 of the second lens element 120 is R3, and they satisfy the relation: R4/R3=0.30.

In the first embodiment of the present optical photographing lens assembly, the distance on the optical axis between the object-side surface 111 of the first lens element 110 (i.e. the lens element with refractive power closest to the object side) and the image-side surface 142 of the fourth lens element 140 (i.e. the lens element with refractive power closest to the image side) is Td, the focal length of the optical photographing lens assembly is f, and they satisfy the relation: Td/f=0.87.

In the first embodiment of the present optical photographing lens assembly, the focal length of the optical photographing lens assembly is f, the focal length of the third lens element 130 is f3, and they satisfy the relation: f/f3=2.23.

In the first embodiment of the present optical photographing lens assembly, the focal length of the optical photographing lens assembly is f, the focal length of the fourth lens element 140 is f4, and they satisfy the relation: f/f4=−2.07.

In the first embodiment of the present optical photographing lens assembly, the focal length of the first lens element 110 is f1, the focal length of the third lens element 130 is f3, and they satisfy the relation: f1/f3=1.64.

In the first embodiment of the present optical photographing lens assembly, half of the diagonal length of the effective pixel area of the electronic sensor is ImgH, the distance on the optical axis between the first stop 101 and the electronic sensor is LS, and they satisfy the relation: (ImgH−0.7*LS)/ImgH=0.09.

In the first embodiment of the present optical photographing lens assembly, half of the diagonal length of the effective pixel area of the electronic sensor is ImgH, the distance on the optical axis between the second stop 102 and the electronic sensor is LS, and they satisfy the relation: (ImgH−0.7*LS)/ImgH=0.36.

In the first embodiment of the present optical photographing lens assembly, half of the aperture diameter of the first stop 101 is YS, half of the diagonal length of the effective pixel area of the electronic sensor is ImgH, and they satisfy the relation: YS/ImgH=0.37.

In the first embodiment of the present optical photographing lens assembly, half of the aperture diameter of the second stop 102 is YS, half of the diagonal length of the effective pixel area of the electronic sensor is ImgH, and they satisfy the relation: YS/ImgH=0.59.

In the first embodiment of the present optical photographing lens assembly, the distance on the optical axis between the first stop 101 and the object-side surface 121 of the second lens element 120 (i.e. the lens element adjacent to and on the object side of the first stop 101) is DS, the distance on the optical axis between the object-side surface 121 of the second lens element 120 (i.e. the lens element adjacent to and on the object side of the first stop 101) and the image-side surface 132 of the third lens element 130 (i.e. the lens element adjacent to and on the image side of the first stop 101) is DL, and they satisfy the relation: DS/DL=0.39.

In the first embodiment of the present optical photographing lens assembly, the distance on the optical axis between the second stop 102 and the object-side surface 131 of the third lens element 130 (i.e. the lens element adjacent to and on the object side of the second stop 102) is DS, the distance on the optical axis between the object-side surface 131 of the third lens element 130 (i.e. the lens element adjacent to and on the object side of the second stop 102) and the image-side surface 142 of the fourth lens element 140 (i.e. the lens element adjacent to and on the image side of the second stop 102) is DL, and they satisfy the relation: DS/DL=0.42.

In the first embodiment of the present optical photographing lens assembly, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=1.91.

The detailed optical data of the first embodiment is shown in FIG. 4 (TABLE 1), and the aspheric surface data is shown in FIG. 5 (TABLE 2), wherein the units of the radius of curvature, the thickness and the focal length are expressed in mm, and HFOV is half of the maximal field of view.

Figure 2A:
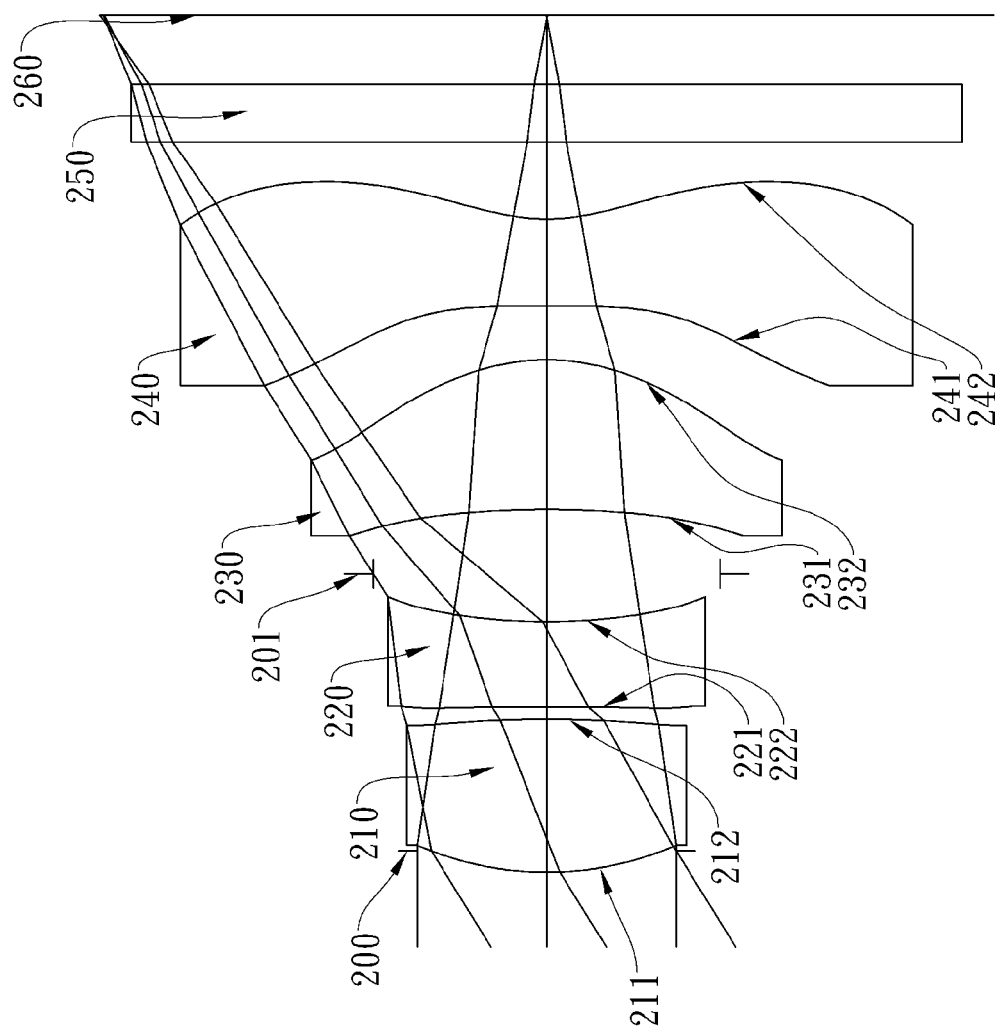
FIG. 2A shows an optical photographing lens assembly in accordance with a second embodiment of the present invention.
Figure 2B:
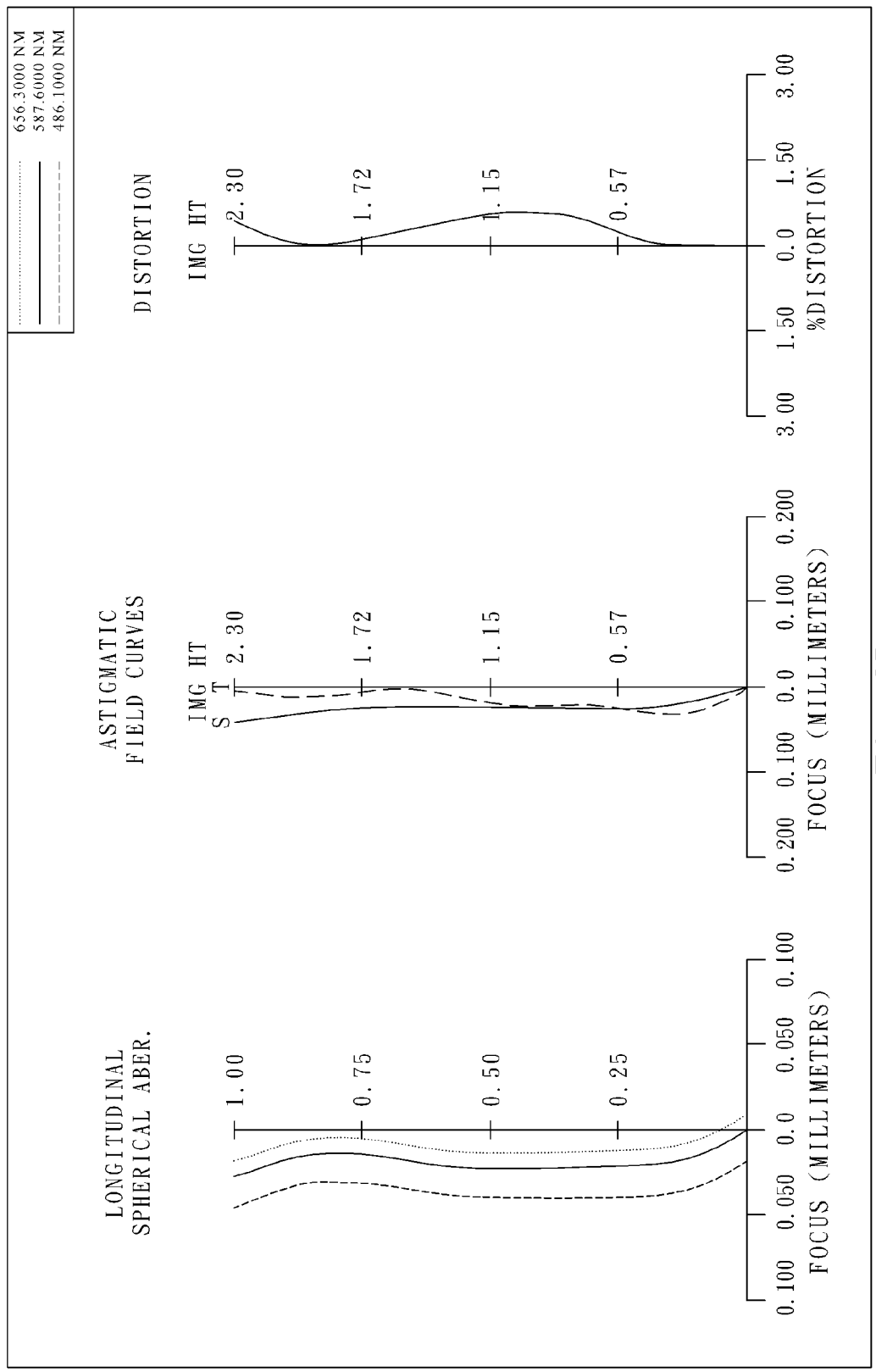
FIG. 2B shows the aberration curves of the second embodiment of the present invention.

FIG. 2A shows an optical photographing lens assembly in accordance with a second embodiment of the present invention, and FIG. 2B shows the aberration curves of the second embodiment of the present invention. The optical photographing lens assembly of the second embodiment of the present invention mainly comprises four lens elements, in order from the object side to the image side: a plastic first lens element 210 with positive refractive power having a convex object-side surface 211 and a convex image-side surface 212, the object-side and image-side surfaces 211 and 212 thereof being aspheric; a plastic second lens element 220 with negative refractive power having a concave object-side surface 221 and a concave image-side surface 222, the object-side and image-side surfaces 221 and 222 thereof being aspheric; a plastic third lens element 230 with positive refractive power having a concave object-side surface 231 and a convex image-side surface 232, the object-side and image-side surfaces 231 and 232 thereof being aspheric; and a plastic fourth lens element 240 with negative refractive power having a concave object-side surface 241 and a concave image-side surface 242 on which at least one inflection point is formed, the object-side and image-side surfaces 241 and 242 thereof being aspheric; wherein an aperture stop 200 is disposed between an imaged object and the first lens element 210; and wherein a first stop 201 is disposed between the second lens element 220 and the third lens element 230 and half of the aperture diameter (YS) thereof is 0.90 mm. The optical photographing lens assembly further comprises an IR filter 250 disposed between the image-side surface 242 of the fourth lens element 240 and an image plane 260; the IR filter 250 is made of glass and has no influence on the focal length of the optical photographing lens assembly. Moreover, an electronic sensor is disposed at the image plane 260 for forming images of the imaged object.

The equation of the aspheric surface profiles of the second embodiment has the same form as that of the first embodiment.

In the second embodiment of the present optical photographing lens assembly, the focal length of the optical photographing lens assembly is f, and it satisfies the relation: f=3.70 (mm).

In the second embodiment of the present optical photographing lens assembly, the f-number of the optical photographing lens assembly is Fno, and it satisfies the relation: Fno=2.75.

In the second embodiment of the present optical photographing lens assembly, half of the maximal field of view of the optical photographing lens assembly is HFOV, and it satisfies the relation: HFOV=31.9 deg.

In the second embodiment of the present optical photographing lens assembly, the Abbe number of the first lens element 210 is V1, the Abbe number of the second lens element 220 is V2, and they satisfy the relation: V1−V2=29.4.

In the second embodiment of the present optical photographing lens assembly, the radius of curvature of the object-side surface 211 of the first lens element 210 is R1, the radius of curvature of the image-side surface 212 of the first lens element 210 is R2, and they satisfy the relation: R1/R2=−0.23.

In the second embodiment of the present optical photographing lens assembly, the radius of curvature of the image-side surface 222 of the second lens element 220 is R4, the radius of curvature of the object-side surface 221 of the second lens element 220 is R3, and they satisfy the relation: R4/R3=−0.03.

In the second embodiment of the present optical photographing lens assembly, the distance on the optical axis between the object-side surface 211 of the first lens element 210 (i.e. the lens element with refractive power closest to the object side) and the image-side surface 242 of the fourth lens element 240 (i.e. the lens element with refractive power closest to the image side) is Td, the focal length of the optical photographing lens assembly is f, and they satisfy the relation: Td/f=0.92.

In the second embodiment of the present optical photographing lens assembly, the focal length of the optical photographing lens assembly is f, the focal length of the third lens element 230 is f3, and they satisfy the relation: f/f3=1.52.

In the second embodiment of the present optical photographing lens assembly, the focal length of the optical photographing lens assembly is f, the focal length of the fourth lens element 240 is f4, and they satisfy the relation: f/f4=−1.91.

In the second embodiment of the present optical photographing lens assembly, the focal length of the first lens element 210 is f1, the focal length of the third lens element 230 is f3, and they satisfy the relation: f1/f3=1.10.

In the second embodiment of the present optical photographing lens assembly, half of the diagonal length of the effective pixel area of the electronic sensor is ImgH, the distance on the optical axis between the first stop 201 and the electronic sensor is LS, and they satisfy the relation: (ImgH−0.7*LS)/ImgH=0.15.

In the second embodiment of the present optical photographing lens assembly, half of the aperture diameter of the first stop 201 is YS, half of the diagonal length of the effective pixel area of the electronic sensor is ImgH, and they satisfy the relation: YS/ImgH=0.39.

In the second embodiment of the present optical photographing lens assembly, the distance on the optical axis between the first stop 201 and the object-side surface 221 of the second lens element 220 (i.e. the lens element adjacent to and on the object side of the first stop 201) is DS, the distance on the optical axis between the object-side surface 221 of the second lens element 220 (i.e. the lens element adjacent to and on the object side of the first stop 201) and the image-side surface 232 of the third lens element 230 (i.e. the lens element adjacent to and on the image side of the first stop 201) is DL, and they satisfy the relation: DS/DL=0.38.

In the second embodiment of the present optical photographing lens assembly, the distance on the optical axis between the object-side surface 211 of the first lens element 210 and the electronic sensor is TTL, half of the diagonal length of the effective pixel area of the electronic sensor is ImgH, and they satisfy the relation: TTL/ImgH=1.89.

The detailed optical data of the second embodiment is shown in FIG. 6 (TABLE 3), and the aspheric surface data is shown in FIG. 7 (TABLE 4), wherein the units of the radius of curvature, the thickness and the focal length are expressed in mm, and HFOV is half of the maximal field of view.

Figure 3A:
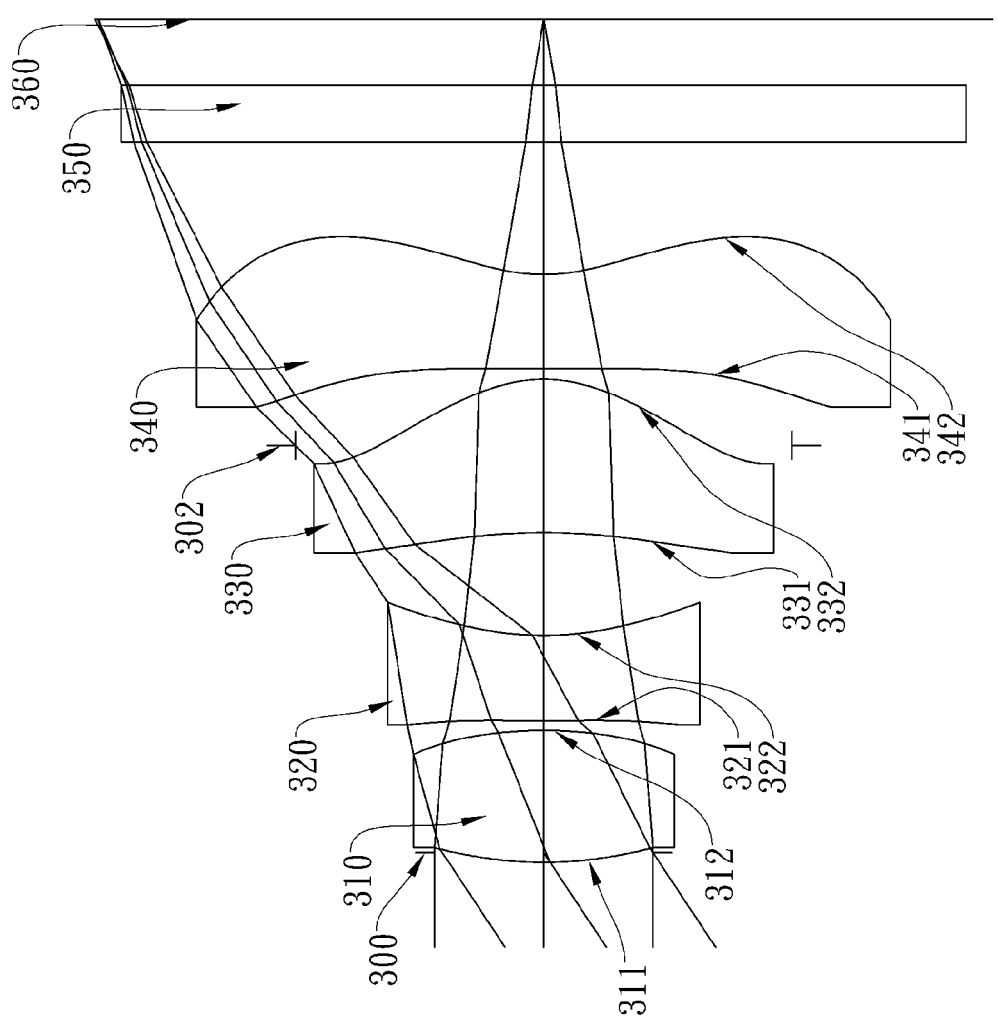
FIG. 3A shows an optical photographing lens assembly in accordance with a third embodiment of the present invention.
Figure 3B:
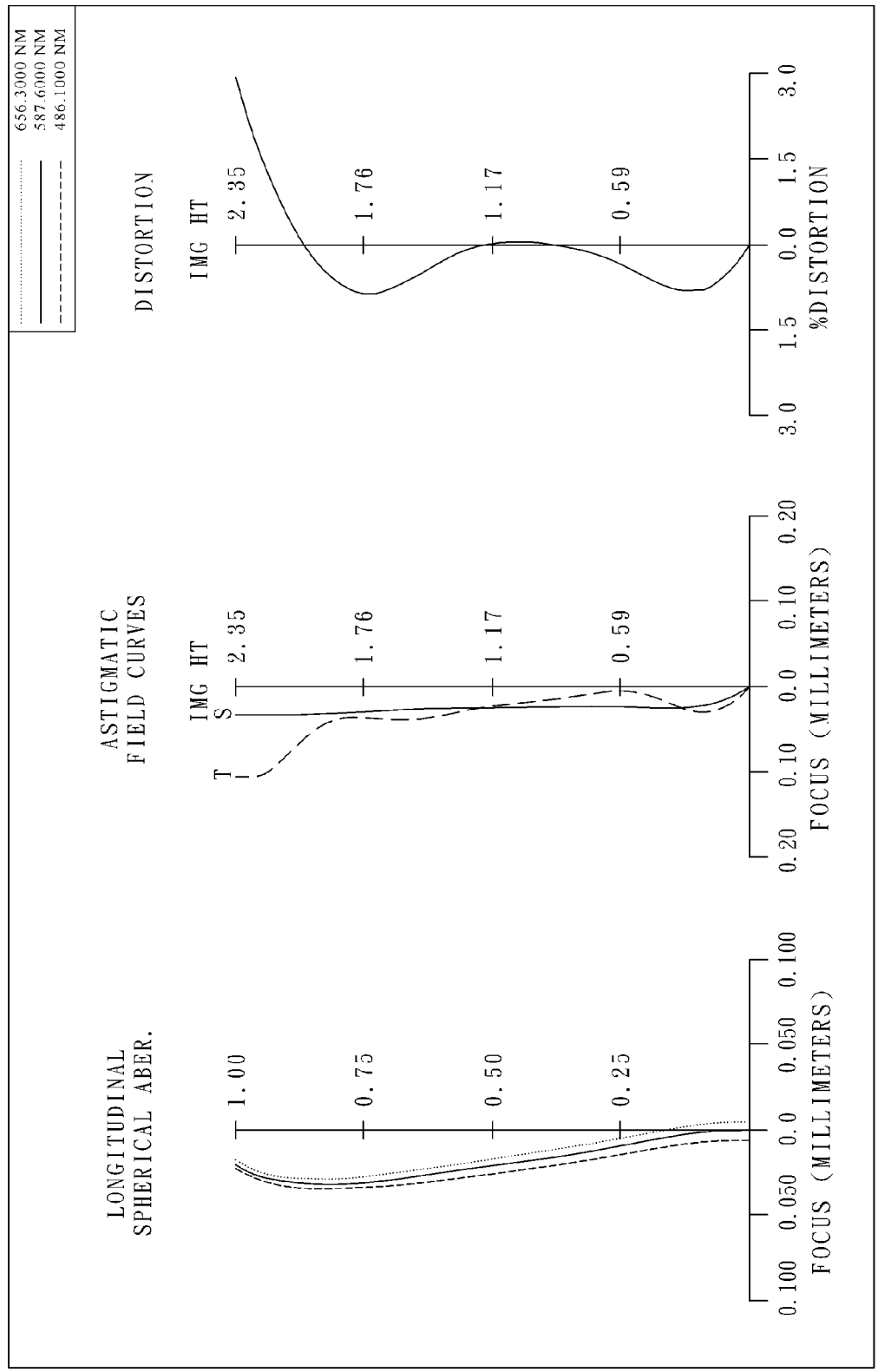
FIG. 3B shows the aberration curves of the third embodiment of the present invention.

FIG. 3A shows an optical photographing lens assembly in accordance with a third embodiment of the present invention, and FIG. 3B shows the aberration curves of the third embodiment of the present invention. The optical photographing lens assembly of the third embodiment of the present invention mainly comprises four lens elements, in order from the object side to the image side: a plastic first lens element 310 with positive refractive power having a convex object-side surface 311 and a convex image-side surface 312, the object-side and image-side surfaces 311 and 312 thereof being aspheric; a plastic second lens element 320 with negative refractive power having a convex object-side surface 321 and a concave image-side surface 322, the object-side and image-side surfaces 321 and 322 thereof being aspheric; a plastic third lens element 330 with positive refractive power having a concave object-side surface 331 and a convex image-side surface 332, the object-side and image-side surfaces 331 and 332 thereof being aspheric; and a plastic fourth lens element 340 with negative refractive power having a convex object-side surface 341 and a concave image-side surface 342 on which at least one inflection point is formed, the object-side and image-side surfaces 341 and 342 thereof being aspheric; wherein an aperture stop 300 is disposed between an imaged object and the first lens element 310; and wherein a second stop 302 is disposed between the third lens element 330 and the fourth lens element 340 and half of the aperture diameter (YS) thereof is 1.31 mm. The optical photographing lens assembly further comprises an IR filter 350 disposed between the image-side surface 342 of the fourth lens element 340 and an image plane 360; the IR filter 350 is made of glass and has no influence on the focal length of the optical photographing lens assembly. Moreover, an electronic sensor is disposed at the image plane 360 for forming images of the imaged object.

The equation of the aspheric surface profiles of the third embodiment has the same form as that of the first embodiment.

In the third embodiment of the present optical photographing lens assembly, the focal length of the optical photographing lens assembly is f, and it satisfies the relation: f=3.43 (mm).

In the third embodiment of the present optical photographing lens assembly, the f-number of the optical photographing lens assembly is Fno, and it satisfies the relation: Fno=3.00.

In the third embodiment of the present optical photographing lens assembly, half of the maximal field of view of the optical photographing lens assembly is HFOV, and it satisfies the relation: HFOV=33.5 deg.

In the third embodiment of the present optical photographing lens assembly, the Abbe number of the first lens element 310 is V1, the Abbe number of the second lens element 320 is V2, and they satisfy the relation: V1−V2=30.0.

In the third embodiment of the present optical photographing lens assembly, the radius of curvature of the object-side surface 311 of the first lens element 310 is R1, the radius of curvature of the image-side surface 312 of the first lens element 310 is R2, and they satisfy the relation: R1/R2=−0.84.

In the third embodiment of the present optical photographing lens assembly, the radius of curvature of the image-side surface 322 of the second lens element 320 is R4, the radius of curvature of the object-side surface 321 of the second lens element 320 is R3, and they satisfy the relation: R4/R3=0.10.

In the third embodiment of the present optical photographing lens assembly, the distance on the optical axis between the object-side surface 311 of the first lens element 310 (i.e. the lens element with refractive power closest to the object side) and the image-side surface 342 of the fourth lens element 340 (i.e. the lens element with refractive power closest to the image side) is Td, the focal length of the optical photographing lens assembly is f, and they satisfy the relation: Td/f=0.90.

In the third embodiment of the present optical photographing lens assembly, the focal length of the optical photographing lens assembly is f, the focal length of the third lens element 330 is f3, and they satisfy the relation: f/f3=2.13.

In the third embodiment of the present optical photographing lens assembly, the focal length of the optical photographing lens assembly is f, the focal length of the fourth lens element 340 is f4, and they satisfy the relation: f/f4=−2.05.

In the third embodiment of the present optical photographing lens assembly, the focal length of the first lens element 310 is f1, the focal length of the third lens element 330 is f3, and they satisfy the relation: f1/f3=1.39.

In the third embodiment of the present optical photographing lens assembly, half of the diagonal length of the effective pixel area of the electronic sensor is ImgH, the distance on the optical axis between the second stop 302 and the electronic sensor is LS, and they satisfy the relation: (ImgH−0.7*LS)/ImgH=0.36.

In the third embodiment of the present optical photographing lens assembly, half of the aperture diameter of the second stop 302 is YS, half of the diagonal length of the effective pixel area of the electronic sensor is ImgH, and they satisfy the relation: YS/ImgH=0.56.

In the third embodiment of the present optical photographing lens assembly, the distance on the optical axis between the second stop 302 and the object-side surface 331 of the third lens element 330 (i.e. the lens element adjacent to and on the object side of the second stop 302) is DS, the distance on the optical axis between the object-side surface 331 of the third lens element 330 (i.e. the lens element adjacent to and on the object side of the second stop 302) and the image-side surface 342 of the fourth lens element 340 (i.e. the lens element adjacent to and on the image side of the second stop 302) is DL, and they satisfy the relation: DS/DL=0.34.

In the third embodiment of the present optical photographing lens assembly, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=1.85.

The detailed optical data of the third embodiment is shown in FIG. 8 (TABLE 5), and the aspheric surface data is shown in FIG. 9 (TABLE 6), wherein the units of the radius of curvature, the thickness and the focal length are expressed in mm, and HFOV is half of the maximal field of view.

It is to be noted that TABLES 1-6 (illustrated in FIGS. 4-9 respectively) show different data of the different embodiments, however, the data of the different embodiments are obtained from experiments. Therefore, any optical photographing lens assembly of the same structure is considered to be within the scope of the present invention even if it uses different data. The embodiments depicted above and the appended drawings are exemplary and are not intended to limit the scope of the present invention. TABLE 7 (illustrated in FIG. 10) shows the data of the respective embodiments resulting from the equations.

What is claimed is:

1. An optical photographing lens assembly comprising, in order from an object side to an image side:
   a first lens element with positive refractive power having a convex object-side surface, at least one of the object-side and image-side surfaces thereof being aspheric;
   a second lens element with negative refractive power having a concave image-side surface;
   a third lens element with positive refractive power having a concave object-side surface and a convex image-side surface; and
   a fourth lens element with negative refractive power having a concave image-side surface on which at least one inflection point is formed, the object-side and image-side surfaces thereof being aspheric; wherein a stop is disposed between an imaged object and the first lens element and an electronic sensor is disposed at an image plane for forming images of the imaged object; wherein the optical photographing lens assembly further comprises another stop disposed between the second lens element and the fourth lens element; and wherein half of a diagonal length of an effective pixel area of the electronic sensor is ImgH, a distance on an optical axis between the another stop disposed between the second lens element and the fourth lens element and the electronic sensor is LS, half of an aperture diameter of the another stop is YS, a distance on the optical axis between the another stop and an object-side surface of a lens element adjacent to and on the object side of the another stop is DS, a distance on the optical axis between the object-side surface of the lens element adjacent to and on the object side of the another stop and an image-side surface of a lens element adjacent to and on the image side of the another stop is DL, a focal length of the optical photographing lens assembly is f, a focal length of the third lens element is f3, a focal length of the fourth lens element is f4, a distance on the optical axis between an object-side surface of a lens element with refractive power closest to the object side and an image-side surface of a lens element with refractive power closest to the image side is Td, an Abbe number of the first lens element is V1, an Abbe number of the second lens element is V2, and they satisfy the relations: (ImgH−0.7*LS)/ImgH<YS/ImgH<0.74, 0.10<DS/DL<0.73, 1.35<f/f3<2.50, −2.60<f/f4<−1.75, 0.85<Td/f<0.92, 20.0<V1−V2<42.0.

2. The optical photographing lens assembly according to claim 1, wherein a distance on the optical axis between the object-side surface of the first lens element and the electronic sensor is TTL, half of the diagonal length of the effective pixel area of the electronic sensor is ImgH, and they satisfy the relation: TTL/ImgH<2.0.

3. The optical photographing lens assembly according to claim 1, wherein the stop disposed between the imaged object and the first lens element is an aperture stop.

4. The optical photographing lens assembly according to claim 3, wherein a focal length of the first lens element is f1, the focal length of the third lens element is f3, and they satisfy the relation: 1.10<f1/f3<1.85.

5. The optical photographing lens assembly according to claim 4, wherein a radius of curvature of the object-side surface of the first lens element is R1, a radius of curvature of the image-side surface of the first lens element is R2, and they satisfy the relation: −1.0<R1/R2<0.

6. The optical photographing lens assembly according to claim 3, wherein the Abbe number of the first lens element is V1, the Abbe number of the second lens element is V2, and they satisfy the relation: 28.5<V1−V2<42.0.

7. The optical photographing lens assembly according to claim 4, wherein a radius of curvature of the image-side surface of the second lens element is R4, a radius of curvature of an object-side surface of the second lens element is R3, and they satisfy the relation: −0.30<R4/R3<0.30.

8. An optical photographing lens assembly comprising, in order from an object side to an image side:
   a first lens element with positive refractive power having a convex object-side surface;
   a second lens element with negative refractive power having a concave image-side surface;
   a third lens element with positive refractive power having a concave object-side surface and a convex image-side surface, the object-side and image-side surfaces thereof being aspheric; and
   a fourth lens element with negative refractive power having a concave image-side surface on which at least one inflection point is formed, the object-side and image-side surfaces thereof being aspheric; wherein a stop is disposed between an imaged object and the first lens element and an electronic sensor is disposed at an image plane for forming images of the imaged object; wherein the optical photographing lens assembly further comprises another stop disposed between the second lens element and the third lens element; and wherein half of a diagonal length of an effective pixel area of the electronic sensor is ImgH, a distance on an optical axis between the another stop disposed between the second lens element and the third lens element and the electronic sensor is LS, half of an aperture diameter of the another stop is YS, a distance on the optical axis between the another stop and an object-side surface of a lens element adjacent to and on the object side of the another stop is DS, a distance on the optical axis between the object-side surface of the lens element adjacent to and on the object side of the another stop and an image-side surface of a lens element adjacent to and on the image side of the another stop is DL, a focal length of the optical photographing lens assembly is f, a focal length of the third lens element is f3, a focal length of the fourth lens element is f4, an Abbe number of the first lens element is V1, an Abbe number of the second lens element is V2, and they satisfy the relations: (ImgH−0.7*LS)/ImgH<YS/ImgH<0.74, 0.10<DS/DL<0.73, 1.35<f/f3<2.50, −2.60<f/f4<−1.75, 28.5<V1−V2<42.0.

9. The optical photographing lens assembly according to claim 8, wherein the stop disposed between the imaged object and the first lens element is an aperture stop.

10. The optical photographing lens assembly according to claim 9, wherein a focal length of the first lens element is f1, the focal length of the third lens element is f3, and they satisfy the relation: 1.10<f1/f3<1.85.

* * * * *